(12) United States Patent
Geftos et al.

(10) Patent No.: US 10,253,914 B2
(45) Date of Patent: Apr. 9, 2019

(54) CLIP HAVING POSITIVE INSTALLATION INDICATOR FOR SECURING FUEL LINE TO FOAM PART

(71) Applicant: Ford Global Technologies, LLC, Dearborn, MI (US)

(72) Inventors: Theodore Thomas Geftos, Monroe, MI (US); Gary Nola, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/216,448

(22) Filed: Jul. 21, 2016

(65) Prior Publication Data

US 2018/0023745 A1    Jan. 25, 2018

(51) Int. Cl.
| | |
|---|---|
| *F16B 2/20* | (2006.01) |
| *F16L 55/035* | (2006.01) |
| *B60R 16/08* | (2006.01) |
| *F16L 3/13* | (2006.01) |
| *B60R 16/02* | (2006.01) |
| *F16B 1/00* | (2006.01) |
| *F16B 2/10* | (2006.01) |

(52) U.S. Cl.
CPC ........ *F16L 55/035* (2013.01); *B60R 16/0215* (2013.01); *B60R 16/08* (2013.01); *F16L 3/13* (2013.01); *F16B 1/0071* (2013.01); *F16B 2/10* (2013.01); *F16L 2201/10* (2013.01)

(58) Field of Classification Search
CPC .............................. F16L 55/48; F16L 2201/10
USPC ....... 248/544, 685, 689, 550, 49, 58, 60, 62, 248/65, 70, 71, 74.1, 74.2, 74.4, 228.7, 248/230.7, 231.81, 316.7; 285/93; 116/281, 282, 283
See application file for complete search history.

(56) References Cited

U.S. PATENT DOCUMENTS

| | | | |
|---|---|---|---|
| 1,580,788 A * | 4/1926 | Lingard | A24F 19/0092 131/241 |
| 2,068,932 A | 1/1937 | Quarnstrom | |
| 2,868,489 A | 1/1959 | Calcut | |
| 3,669,427 A * | 6/1972 | Curtis | A63B 47/02 294/19.2 |

(Continued)

FOREIGN PATENT DOCUMENTS

| | | |
|---|---|---|
| JP | 2007046696 A | 2/2007 |
| JP | 2007292285 A | 11/2007 |

*Primary Examiner* — Terrell L McKinnon
*Assistant Examiner* — Michael McDuffie
(74) *Attorney, Agent, or Firm* — LeClairRyan

(57) ABSTRACT

A single piece, installation indicating clip to secure a foam part to a substrate is provided. The clip includes a pair of spaced apart and opposed curvilinear retention clip arms, a planar foam part retaining member, a bridge having first and second ends, and an installation indicator. The insulation part is captured between the planar foam part retaining member and the clip arms. The installation indicator includes a movable indicator pin. The pin is provided within a pin enclosure having a biasing member that urges the pin to its retracted position. A portion of the pin extends between the clip arms. Upon attachment of the retention clip to the fluid line, the indicator pin is pushed by the fluid line from its retracted position to its attachment indicating position, thereby visually verifying to the installer that successful installation of the retention clip has been made.

20 Claims, 3 Drawing Sheets

(56) References Cited

U.S. PATENT DOCUMENTS

| | | | | |
|---|---|---|---|---|
| 4,013,295 A * | 3/1977 | Baughman | A63B 47/02 | 294/19.2 |
| 4,083,522 A * | 4/1978 | Vandersip | F16L 3/2053 | 248/59 |
| 4,100,691 A | 7/1978 | Wicklund | | |
| 4,119,285 A | 10/1978 | Bisping et al. | | |
| 4,693,473 A * | 9/1987 | Miller | A63B 47/02 | 294/19.2 |
| 4,717,100 A * | 1/1988 | Klein | F16B 21/086 | 248/73 |
| 5,009,386 A * | 4/1991 | Berger | F16L 3/2053 | 248/59 |
| 5,108,054 A * | 4/1992 | Degand | F16L 3/13 | 248/50 |
| 5,257,762 A * | 11/1993 | Trame | B29C 45/26 | 248/50 |
| 5,768,882 A * | 6/1998 | Weber | F16G 13/16 | 248/49 |
| 5,797,675 A * | 8/1998 | Tanner, Jr. | F16L 3/13 | 248/50 |
| 6,361,094 B1 * | 3/2002 | Pelley | A63B 47/02 | 294/115 |
| 7,383,655 B2 | 6/2008 | McGarry | | |
| 7,536,816 B2 | 5/2009 | Weinberger | | |
| 7,802,762 B2 * | 9/2010 | Bauer | B60R 16/0215 | 24/555 |
| 8,109,162 B2 * | 2/2012 | Laymon | F16L 55/48 | 116/281 |
| 8,662,455 B2 | 3/2014 | Hernandez et al. | | |
| 8,900,196 B2 * | 12/2014 | Andino | A61M 5/1418 | 604/174 |
| 9,590,402 B2 * | 3/2017 | Lawrence | F16L 3/04 | |
| 2005/0067537 A1 * | 3/2005 | Caveney | H01H 3/16 | 248/49 |
| 2007/0187556 A1 * | 8/2007 | Yoshitake | F16L 3/02 | 248/58 |
| 2012/0271237 A1 * | 10/2012 | Andino | A61M 5/1418 | 604/174 |
| 2014/0217244 A1 * | 8/2014 | Shiga | B60R 16/0215 | 248/49 |
| 2016/0053917 A1 * | 2/2016 | Kean | F16L 3/2235 | 248/58 |

* cited by examiner

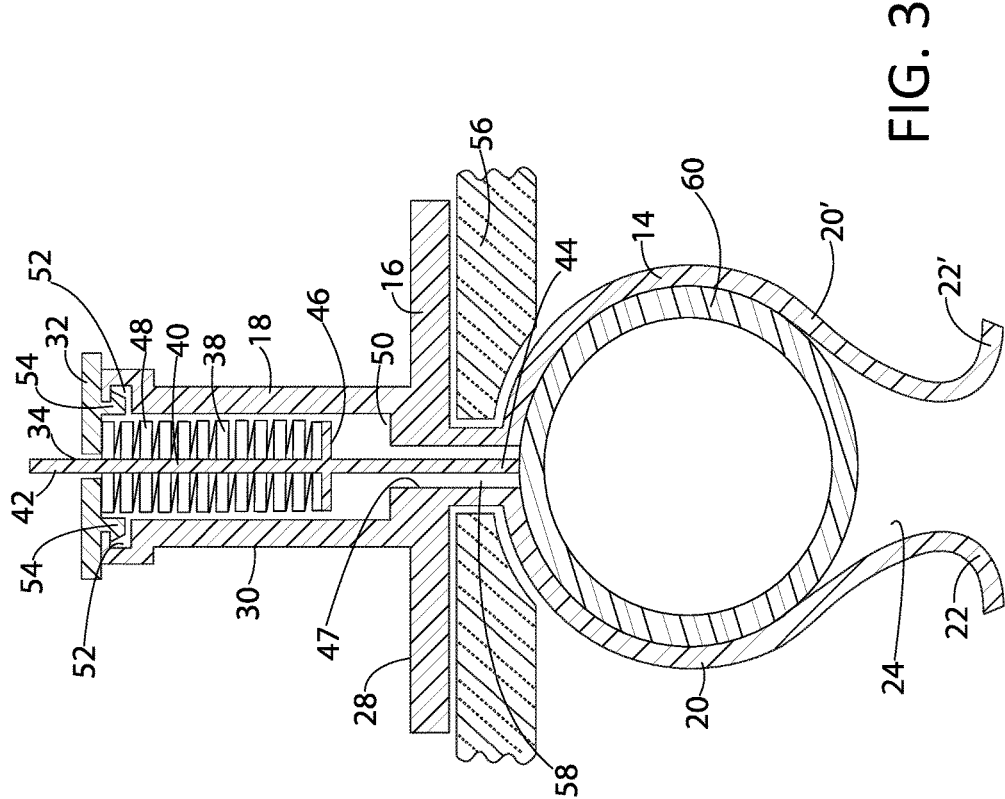

CLIP HAVING POSITIVE INSTALLATION INDICATOR FOR SECURING FUEL LINE TO FOAM PART

TECHNICAL FIELD

The disclosed inventive concept relates to retention clips for attaching fluid-carrying lines or fluid-carrying tubes to a foam substrate. More particularly, the disclosed inventive concept relates to a retention clip for attaching a fluid-carrying line or a fluid-carrying tube to a foam substrate in which the retention clip includes a positive installation indicator. The retention clip includes a upper portion having a planar attachment part that attaches to the foam substrate and a lower portion having opposed arms that retain the line or tube. A movable plunger having an installation indicator tip is displaced from a recessed position when no line or tube is attached to the clip to an extended position when a line or tube is attached to the clip.

BACKGROUND OF THE INVENTION

It is the inherent nature of automotive vehicles that different components emit sounds and vibrations that are unpleasant to the vehicle occupants. Various approaches have been undertaken to deaden these sounds and vibrations including, for example, insulating coatings for direct application to a substrate and foam segments. As a general matter, however, the insulating characteristics of foam parts are superior to insulating coatings and offer flexibility not provided for in most coatings.

It is important that the foam parts are secured in place in strategic locations in the vehicle to prevent their being dislodged. A variety of approaches have been taken to secure the foam part in place on the substrate. One approach taken is to use an adhesive to hold the foam part to the substrate. However, the use of an adhesive prohibits the convenient removal of the foam part when needed for repair or vehicle maintenance without destroying the part.

A common alternative to adhesives to holding a foam part to a vehicle substrate is the use of one or more mechanical fasteners. Examples of such fasteners include nuts and bolts, ball studs and grommets, zip ties, or Velcro® fasteners. While providing a certain degree of effectiveness, these solutions suffer certain disadvantages. These mechanical fasteners are frequently not customer friendly and can be difficult to install. In addition, they frequently are not serviceable, are not robust, or are expensive. In addition, some of these mechanical fasteners require over-molding which presents manufacturing limits. Furthermore, very often mechanical fasteners damage the foam parts when removed for servicing or even during vehicle operation. Typically the mechanical fasteners are made of metal and thus are susceptible to metal corrosion at the point of contact as water, and in certain driving conditions, road salt tend to accumulate at the point of contact, leading to failure. Many times a mechanical part suffers from several of these disadvantages.

It is also known that a variety of fasteners are required in the automotive vehicle for attaching various fluid lines, such as fuel lines, to a substrate. It would be beneficial for the installer to have a way to visually confirm that the fluid line has been successfully attached to the fastener.

Accordingly, known approaches to attaching foam parts to a substrate or to the substructure of a vehicle have not produced satisfactory results. Furthermore, it would be useful to have a fastener for attaching a fluid line to a substrate on a vehicle that allows visual verification of successful attachment. As in so many areas of vehicle technology, there is always room for improvement related to fastening systems used in the automotive vehicle.

SUMMARY OF THE INVENTION

The disclosed inventive concept provides a single piece clip for attaching a foam part to a substrate such as a fluid line in which the clip includes an installation indicator for confirming proper installation of the fluid line. The retention clip of the disclosed inventive concept overcomes the problems of known methods of attaching a foam part to a substrate that provides a corrosion-resistant retention clip that is flexible and easily fitted to the substrate. The disclosed inventive concept provides a single piece clip that is designed to secure foam parts as a form of positive retention. The clip is easy to install into foam parts and is also easy to engage with the component to which the foam part will be attached. The retention clip is configured to prevent ripping of the foam either during servicing of the vehicle or during normal operation of the vehicle.

The retention clip includes a pair of spaced apart and opposed curvilinear retention clip arms, a planar foam part retaining member, and a bridge having a first end and a second end. The first end of the bridge extends from the planar foam part retaining member. The clip arms are flexibly attached to the second end of the bridge. The insulation part is captured between the planar foam part retaining member and the clip arms, preferably prior to attachment of the retention clip to the substrate. The retention clip may be composed of a polymerized material such as a plastic. Each of the clip arms includes a body having a wide part and a narrow part. The wide part of each of clip arm is attached to the bridge. A hook is formed at the narrow part of each arm.

An installation indicator is provided on the clip body. The installation indicator includes a movable indicator pin. The pin is provided within a pin enclosure having a biasing member that urges the pin to its retracted position. A portion of the pin extends between the clip arms. Upon attachment of the retention clip to the fluid line, the indicator pin is pushed by the fluid line from its retracted position to its attachment indicating position, thereby visually verifying to the installer that successful installation of the retention clip has been made.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiment illustrated in greater detail in the accompanying drawings and described below by way of examples of the invention wherein:

FIG. 3 is a view similar to that of FIG. 2 but illustrating a fluid carrying line having been attached to the clip and the installation indicator having been moved from its retracted position to its attachment indicating position.

DETAILED DESCRIPTION OF THE PREFERRED EMBODIMENT

Figure 1:
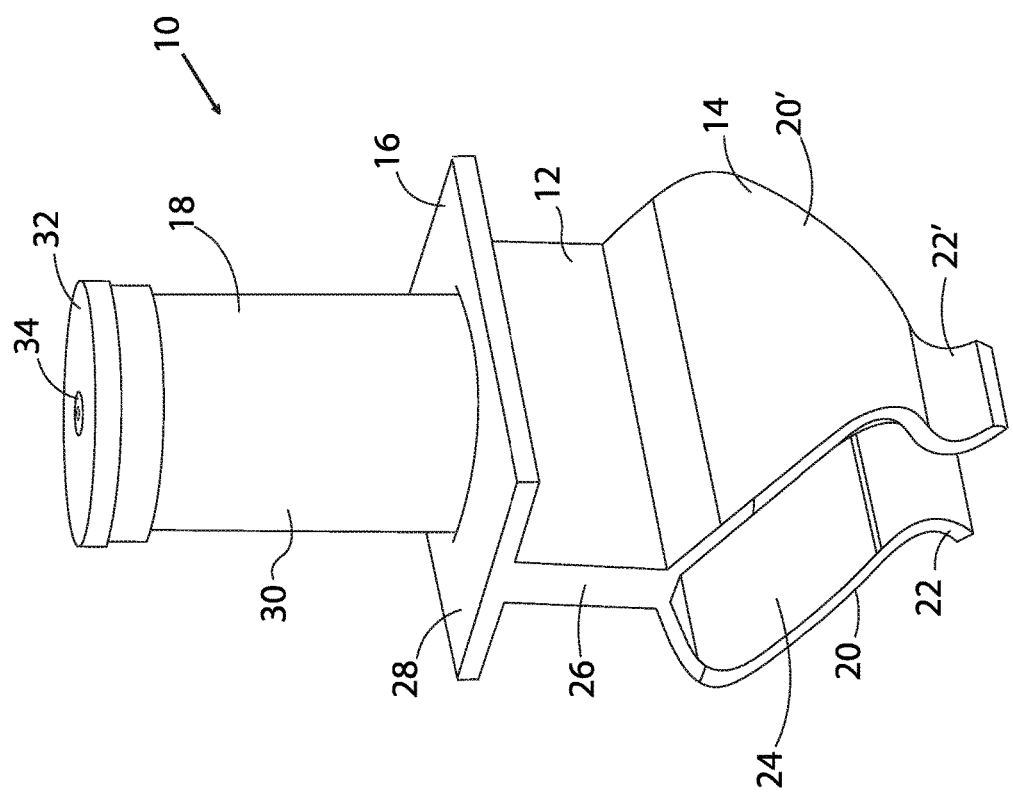
FIG. 1 is a perspective view of a retention clip having an installation indicator according to the disclosed inventive concept.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate the retention clip according to the disclosed inventive concept. The embodiment of the disclosed inventive concept is illustrated as being both isolated and attached to a foam part. The embodiment of the disclosed inventive concept is also illustrated as being unattached to a substrate whereby the installation indicator is in its retracted position as well as being attached to the substrate whereby the installation indicator is in its attachment indicating position, thereby visually verifying to the installer that successful installation of the retention clip has been made. It is to be understood that the shapes of the embodiments of the retention clips illustrated in the figures is only illustrative as other shapes may be possible without deviating from the spirit and scope of the disclosed inventive concept.

Referring to FIG. 1, a perspective view of a retention clip according to an embodiment of the disclosed inventive concept, generally illustrated as 10, is shown. The retention clip 10 is illustrated in this figure as being unattached to either the insulator or the substrate.

The retention clip 10 includes a retention clip body 12 defined by a retention clip body lower portion 14, a retention clip body upper portion 16, and an installation indicator housing portion 18. The retention clip body 12 is formed from any one of several polymerized materials including, without limitation, a molded plastic. The retention clip body lower portion 14 is configured for attachment to a substrate such as a fluid line. The retention clip body upper portion 16 is configured for attachment to a foam insulating part.

The retention clip body lower portion 14 includes a pair of opposed and spaced apart retention clip arms 20 and 20'. The retention clip arm 20 includes a hooked end 22 and the retention clip arm 20' includes a hooked end 22'. The retention clip arms 20 and 20' are flexibly attached to one another. The hooked ends 22 and 22' allow for smooth and simple attachment to the fluid line substrate.

The opposed and spaced apart retention clip arms 20 and 20' define a space 24 therebetween. The space 24 allows for movement of the retention clip arms 20 and 20' away from one another when the retention clip 10 is attached to the substrate.

The retention clip body upper portion 16 includes a bridge 26 connected at one end to the retention clip arms 20 and 20' and at the other end to a planar foam part retaining member 28. The length of the bridge 26 is proportioned for foam parts of different thicknesses.

The installation indicator housing portion 18 includes a cylindrical body 30 and a cover 32 attached to the cylindrical body 30. An indicator indicator pin aperture 34 is centrally formed in the cover 32. The cylindrical body 30 is attached to the foam part retaining member 28.

Figure 2:
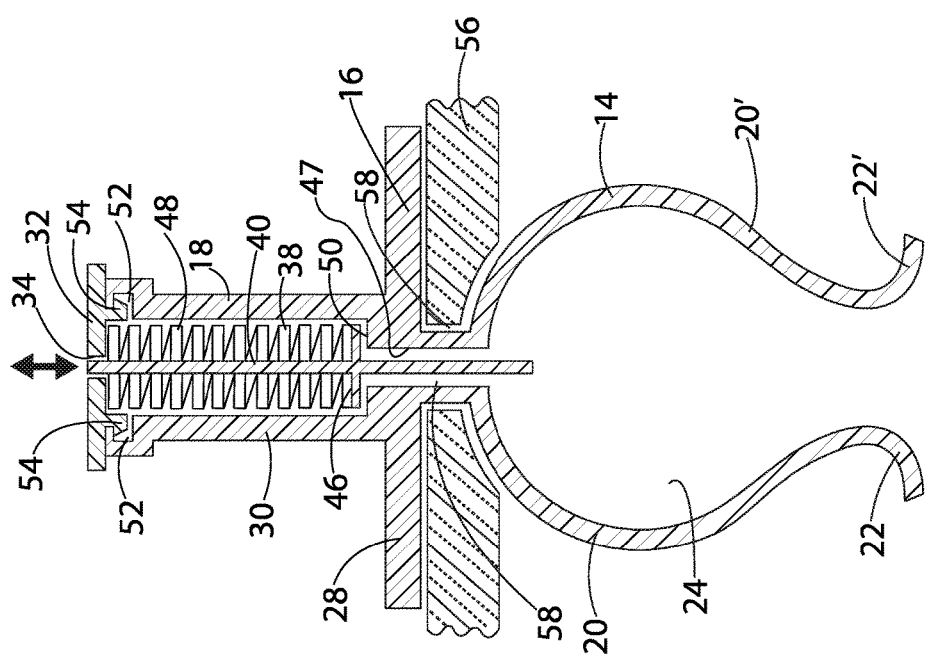
FIG. 2 is a sectional view of the retention clip having an installation indicator shown in FIG. 1 in which the installation indicator is in its retracted position.

Referring to FIG. 2, a sectional view of the retention clip 10 is illustrated with insulation but before it is attached to the substrate. Because the retention clip 10 is not attached to the substrate, the installation indicator is illustrated in its retracted or stowed position.

An installation indicator assembly 38 is provided substantially within the installation indicator housing portion 18. The installation indicator assembly 38 includes an axially movable elongated installation indicator 40 having a pop-up visual indicator end 42, a substrate contact end 44, and a stop plate 46. The pop-up visual indicator end 42 is substantially recessed within the indicator pin aperture 34 is illustrated when the retention clip 10 is not attached to a substrate. The substrate contact end 44 movably extends through an aperture 47 formed in the bridge 26.

A biasing member 48 such as a spring is provided between the underside of the cover 32 and the stop plate 46. The biasing member 48 maintains the elongated installation indicator 40 in its retracted position as illustrated in FIG. 2 by urging the stop plate 46 of the elongated installation indicator 40 toward an inner wall 50 formed at the base of the cylindrical body 30 of the installation indicator housing portion 18.

The cover 32 is attached to the opposite end of the cylindrical body 30 which includes a channel 52. The cover 32 includes a hook 54 that is snap-fitted into the channel 52, thereby fixing the cover 32 to the cylindrical body 30.

As noted, the retention clip 10 is shown in FIG. 2 as being attached to insulation. Particularly, the retention clip 10 is illustrated in its general position attached to an insulation foam part 56 prior to attachment to a substrate. The bridge 47 is fitted through a slit 58 formed in the insulation foam part 56 to secure attachment of the retention clip 10 to the foam part 56. The slit 58 is wide enough so that the retention clip body lower portion 14 may be inserted without damaging the foam part 56.

Once the retention clip 10 is attached to the foam part 56, the retention clip 10 is attached to a substrate. As illustrated in FIG. 3, the retention clip 10, now attached to the insulation foam part 56, is shown in cross-section as being attached to a substrate 60 in the form of a fluid line, such as a fuel line. When the fluid line substrate 60 is fully inserted between the retention clip arms 20 and 20', the fluid line substrate presses against the substrate contact end 44 of the elongated installation indicator 40, thereby displacing the elongated installation indicator 40 from its recessed position shown in FIG. 2 to the attachment indicating position shown in FIG. 3 wherein the pop-up visual indicator end 42 extends through the indicator pin aperture 34 and beyond the plane of the cover 32. The installer is thus able to easily visually confirm that the fluid line substrate 60 has been properly seated within the space 24 defined between the retention clip arms 20 and 20'.

Thus, the disclosed invention as set forth above overcomes the challenges faced by known approaches to attaching insulating foam parts to different substrates on a vehicle in such a way that the foam part is neither damaged upon removal nor in operation. The retention clip is of relatively low cost to manufacture and thus helps to keep manufacturing expenses to a minimum. In addition, the retention clip is easy to attach and detach, thus minimizing time required for servicing the vehicle. Furthermore, the installation indicator readily and easily confirms property attachment of the retention clip to the substrate. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An installation indicating retention clip for attaching an insulation part to a substrate comprising:
   a pair of spaced apart and opposed curvilinear retention clip arms;
   a planar foam part retaining member; and
   an installation indicating assembly including a housing attached to said retaining member and an axially movable elongated installation indicator having a pop-up visual indicator end and a substrate contact end, said substrate contact end extending between said arms and through said retaining member.

2. The installation indicating retention clip of claim 1, further including a cover attached to said housing, said cover including an indicator pin aperture through which said pop-up visual indicator end extends.

3. The installation indicating retention clip of claim 2, wherein said elongated installation indicator is movable between a retracted position indicating that no substrate is present and an extended position indicating that a substrate is present.

4. The installation indicating retention clip of claim 3, wherein said installation indicating assembly further includes a biasing member for urging said elongated installation indicator to said retracted position.

5. The installation indicating retention clip of claim 4, wherein said elongated installation indicator includes a stop plate against which said biasing member is positioned.

6. The installation indicating retention clip of claim 1, further including a bridge having a first end and a second end, said first end extending from said planar foam part retaining member, said clip arms being flexibly attached to said second end of said bridge.

7. The installation indicating retention clip of claim 1, wherein each of said arms includes a hooked end.

8. The installation indicating retention clip of claim 1, wherein the retention clip is composed of a polymerized material.

9. The installation indicating retention clip of claim 1, wherein the insulation part is fitted between said pair of spaced apart and opposed curvilinear retention clip arms and said planar foam part retaining member.

10. The installation indicating retention clip of claim 6, wherein each of said clip arms includes a body having a wide part and a narrow part.

11. The installation indicating retention clip of claim 10, wherein said wide part of each of said clip arms is attached to said bridge.

12. An installation indicating retention clip for attaching an insulation part to a substrate on a vehicle comprising:
    a pair of spaced apart and opposed curvilinear retention clip arms;
    a planar foam part retaining member; and
    an installation indicating assembly including a housing, said housing being attached to said retaining member, and an axially movable elongated installation indicator having a pop-up visual indicator end, said elongated installation indicator extending through said retaining member.

13. The installation indicating retention clip of claim 12, wherein said elongated installation indicator includes a substrate contact end extending between said arms.

14. The installation indicating retention clip of claim 12, wherein said elongated installation indicator is movable between a retracted position indicating that no substrate is present and an extended position indicating that a substrate is present.

15. The installation indicating retention clip of claim 14, wherein said installation indicating assembly further includes a biasing member for urging said elongated installation indicator to said retracted position.

16. The installation indicating retention clip of claim 15, wherein said elongated installation indicator includes a stop plate against which said biasing member is positioned.

17. The installation indicating retention clip of claim 12, further including a bridge having a first end and a second end, said first end extending from said planar foam part retaining member, said clip arms being flexibly attached to said second end of said bridge.

18. An installation indicating retention clip comprising:
    a pair of spaced apart and opposed curvilinear retention clip arms;
    a foam part retaining member;
    a bridge having a first end and a second end, said first end extending from said retaining member, said arms being flexibly attached to said second end of said bridge; and
    an installation indicating assembly including a housing, a movable elongated installation indicator extending through said bridge, and a biasing member.

19. The installation indicating retention clip of claim 18, wherein said elongated installation indicator includes a substrate contact end extending between said arms and a pop-up visual indicator end.

20. The installation indicating retention clip of claim 19, wherein said cover includes an indicator pin aperture through which said pop-up visual indicator end extends.

* * * * *